United States Patent
Gross

Patent Number: 5,444,897
Date of Patent: Aug. 29, 1995

[54] HOOKS RECIPROCABLE BETWEEN A RECESSED INOPERATIVE POSITION AND AN EXPOSED OPERATIVE POSITION

[76] Inventor: Nathan R. Gross, HCR 70 Box 64, Volborg, Mont. 59851

[21] Appl. No.: 178,008

[22] Filed: Jan. 6, 1994

[51] Int. Cl.⁶ .................................... B63B 21/04
[52] U.S. Cl. ........................ 24/265 CD; 24/115 K; 410/107; 410/111
[58] Field of Search ........ 24/68 CD, 115 K, 265 CD, 24/265 R; 410/83, 101, 102, 107, 111; 114/218

[56] References Cited

U.S. PATENT DOCUMENTS

| | | | |
|---|---|---|---|
| 3,102,708 | 9/1963 | Crain | 410/107 |
| 4,072,113 | 2/1978 | Thurston | 24/115 K X |
| 4,820,093 | 4/1989 | Hirakui et al. | 410/111 X |
| 4,820,094 | 4/1989 | Hirakui et al. | 410/111 X |
| 4,890,566 | 1/1990 | Morris | 410/111 X |
| 4,945,849 | 8/1990 | Morris et al. | 410/111 X |
| 5,004,388 | 4/1991 | Harris | 410/111 X |
| 5,106,248 | 4/1992 | Harris | 410/107 |
| 5,301,627 | 4/1994 | Czipri | 114/218 |

*Primary Examiner*—James R. Brittain

[57] ABSTRACT

A hook reciprocable between a recessed inoperative position and an exposed operative position and comprises a housing formed with a cylindrical side wall which has an open exterior end and an interior end with a circular end cap enclosing the side wall at the interior end to define a cylindrical opening therebetween. A flange extends radially outwardly from the open exterior end. A pair of apertures are formed through a central axial extent of the side wall at diametrically opposed locations and exteriorly facing marking notches formed on the exterior surface of the flange in circumferential alignment with the apertures. A support is positioned within the opening of the housing. The support has an interior extent in a cylindrical configuration and a forward extent with a hook. The cylindrical extent includes a pair of recesses. A pair of leaf springs each have a forward end, a rearward end and a central portion therebetween. The forward end is secured to the exterior surface of the housing. The rearward end is movable radially with respect to its associated aperture. The central portion has a forward extent and a rearward extent and extends into the housing. A coil spring is located between the forward surface of the end cap and the rearward surface of the housing and urges the housing to the deployed orientation.

4 Claims, 4 Drawing Sheets

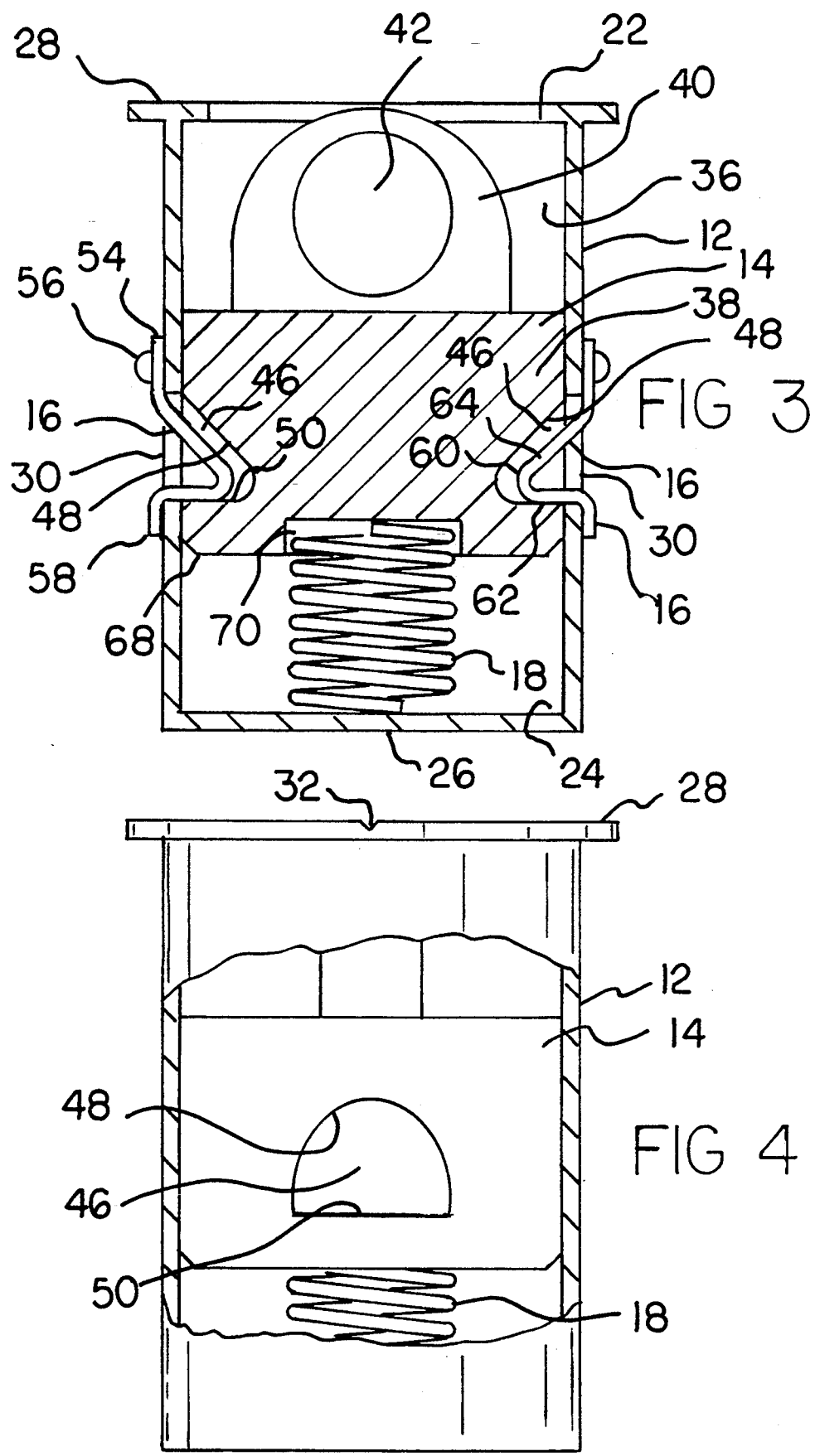

HOOKS RECIPROCABLE BETWEEN A RECESSED INOPERATIVE POSITION AND AN EXPOSED OPERATIVE POSITION

BACKGROUND OF THE INVENTION

1. Field of the Invention

The present invention relates to hooks reciprocable between a recessed inoperative position and an exposed operative position and more particularly pertains to moving a hook between a recessed inoperative position and an extended operative position through an insert and housing readily lockable with respect to each other.

2. Description of the Prior Art

The use of hooks is known in the prior art. More specifically, hooks heretofore devised and utilized for the purpose of moving between operative and inoperative positions are known to consist basically of familiar, expected, and obvious structural configurations, notwithstanding the myriad of designs encompassed by the crowded prior art which has been developed for the fulfillment of countless objectives and requirements.

The prior art discloses a large number of hooks. By way of example, U.S. Pat. No. 3,865,048 to Wallace discloses a truck bed tie-down anchoring device.

U.S. Pat. No. 4,242,022 to Fredrickson discloses mounting D-rings on truck trailers.

U.S. Pat. Nos. 4,762,449 and 4,948,311, both to St. Pierre, disclose tie down fittings.

U.S. Pat. No. 4,820,093 to Hirakui discloses a retractable rope hook arrangement for vehicle.

In this respect, hooks reciprocable between a recessed inoperative position and an exposed operative position according to the present invention substantially depart from the conventional concepts and designs of the prior art, and in doing so provide an apparatus primarily developed for the purpose of moving between a recessed inoperative position and an extended operative position through an insert and housing readily lockable with respect to each other.

Therefore, it can be appreciated that there exists a continuing need for new and improved hooks reciprocable between a recessed inoperative position and an exposed operative position which can be used for moving between a recessed inoperative position and an extended operative position through an insert and housing readily lockable with respect to each other. In this regard, the present invention substantially fulfills this need.

SUMMARY OF THE INVENTION

In view of the foregoing disadvantages inherent in the known types of hooks now present in the prior art, the present invention provides improved hooks reciprocable between a recessed inoperative position and an exposed operative position. As such, the general purpose of the present invention, which will be described subsequently in greater detail, is to provide new and improved hooks reciprocable between a recessed inoperative position and an exposed operative position and methods which have all the advantages of the prior art and none of the disadvantages.

To attain this, the present invention essentially comprises a new and improved hook assembly reciprocable between a recessed inoperative position and an exposed operative position comprising, in combination, a housing formed with a cylindrical side wall having an open exterior end and an interior end with a circular end cap enclosing the side wall at the interior end to define a cylindrical opening therebetween, a flange extending radially outwardly from the open exterior end, a pair of apertures formed through a central axial extent of the side wall at diametrically opposed locations and exteriorly facing marking notches formed on the exterior surface of the flange in circumferential alignment with the apertures. A support is positionable within the opening of the housing, the support having an interior extent in a cylindrical configuration and a forward extent with a hook, the cylindrical extent including a pair of recesses at an intermediate axial extent defining a rearward portion inwardly thereof and a forward portion outwardly thereof, each recess having an angled forward ramp and a rearward radial edge. A pair of leaf springs are provided, each having a forward end secured to the exterior surface of the housing axially aligned on opposite sides of the housing and a rearward end movable radially with respect to its associated aperture and with its central extent extending into the housing, the central portion of each spring being configured with a rearward extent extending axially transverse to the longitudinal axis of the housing and support and with the forward extent of the spring formed at an angle generally parallel with the ramp, the housing with its apertures and springs being sized and positioned with respect to the support and its recesses whereby when the hook is in the forward operative position the central portions of the springs are located within the recesses to effect a locking relationship therebetween but when the support is depressed the support will move radially outwardly by the force of the ramp of the support against the forward extent of the spring to effect a disengagement therebetween whereupon rotation of the support will allow the support to move the hook to the operative position; a coil spring located between the end cap and the rearward surface of the support urging the support to the exposed operative orientation. The hook is formed as a circular loop and further includes an arcuate extent within the circular loop for functioning as a rope gripper with barbs on the interior surface of the arcuate extent. Further included is a cutting blade formed on an exterior portion of the loop with a clip pivotally mounted with respect thereto for shielding the blade for safety purposes.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the Scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved hooks reciprocable between a recessed inoperative position and an exposed operative position which have all the advantages of the prior art hooks and none of the disadvantages.

It is another object of the present invention to provide new and improved hooks reciprocable between a recessed inoperative position and an exposed operative position which may be easily and efficiently manufactured and marketed.

It is a further object of the present invention to provide new and improved hooks reciprocable between a recessed inoperative position and an exposed operative position which are of a durable and reliable construction.

An even further object of the present invention is to provide new and improved hooks reciprocable between a recessed inoperative position and an exposed operative position which are susceptible of a low cost of manufacture with regard to both materials and labor, and which accordingly are then susceptible of low prices of sale to the consuming public, thereby making such hooks reciprocable between a recessed inoperative position and an exposed operative position economically available to the buying public.

Still yet another object of the present invention is to provide new and improved hooks reciprocable between a recessed inoperative position and an exposed operative position which provide in the apparatuses and methods of the prior art some of the advantages thereof, while simultaneously overcoming some of the disadvantages normally associated therewith.

Even still another object of the present invention is to move a hook between a recessed inoperative position and an extended operative position through an insert and housing readily lockable with respect to each other.

Lastly, it is an object of the present invention to provide new and improved hook reciprocable between a recessed inoperative position and an exposed operative position comprising a housing formed with a cylindrical side wall having an open exterior end and an interior end with a circular end cap enclosing the side wall at the interior end to define a cylindrical opening therebetween, a flange extending radially outwardly from the open exterior end, a pair of apertures formed through a central axial extent of the side wall at diametrically opposed locations and exteriorly facing marking notches formed on the exterior surface of the flange in circumferential alignment with the apertures; a support positionable within the opening of the housing, the support having an interior extent in a cylindrical configuration and a forward extent with a hook, the cylindrical extent including a pair of recesses at an intermediate axial extent defining a rearward portion inwardly thereof and a forward portion outwardly thereof, each recess having an angled forward ramp and a rearward radial edge; a pair of leaf springs each having a forward end secured to the exterior surface of the housing axially aligned on opposite sides of the housing and a rearward end movable radially with respect to its associated aperture and with its central extent extending into the housing, the central portion of each spring being configured with a rearward extent extending axially transverse to the longitudinal axis of the housing and support and with the forward extent of the spring formed at an angle generally parallel with the ramp; and a coil spring located between the forward surface of the end cap and the rearward surface of the housing urging the housing to the deployed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the device Figures taken axially through the device when in the inoperative position.

FIG. 4 is a partial sectional view similar to that of FIG. 3 but taken at a orientation rotated ninety degrees with respect thereto.

The same reference numerals refer to the same parts throughout the various Figures.

DESCRIPTION OF THE PREFERRED EMBODIMENT

Figure 1:
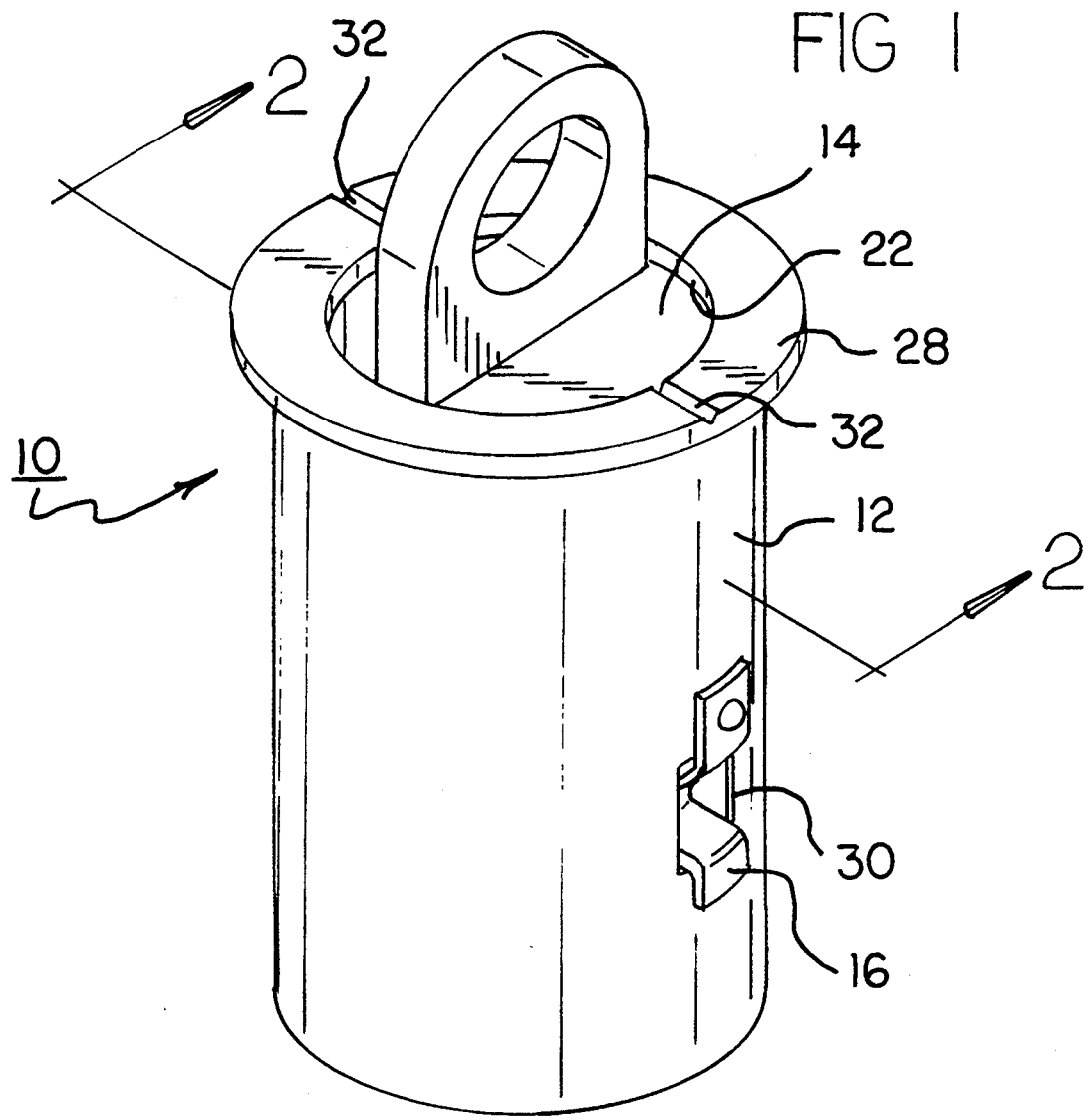
FIG. 1 is a perspective illustration of the preferred embodiment of the hooks reciprocable between a recessed inoperative position and an exposed operative position constructed in accordance with the principles of the present invention.
Figure 2:
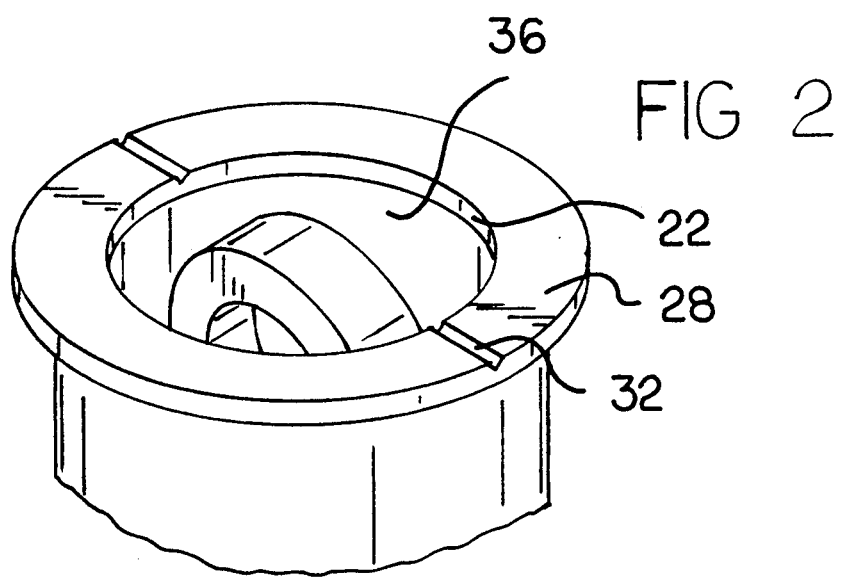
FIG. 2 is a partial perspective view of the upper extent of the device of FIG. 1 but illustrating the hook in the recessed inoperative position.

With reference now to the drawings, and in particular to FIG. 1 thereof, the preferred embodiment of the new and improved hooks reciprocable between a recessed inoperative position and an exposed operative position embodying the principles and concepts of the present invention and generally designated by the reference numeral 10 will be described.

Specifically, it will be noted with reference to FIGS. 1 through 4 that the present invention is a new and improved hook assembly 10 reciprocable between a recessed inoperative position and an exposed operative position. The hook assembly 10 comprises, in its broadest context, a housing 12, support 14, a pair of leaf springs 16, and a coil spring 18.

More specifically, the housing 12 is formed as a cylinder with a cylindrical side wall. The side wall has an opened exterior end 22 and an interior end 24. The interior end 24 has a circular end cap 26 enclosing the side wall at the interior end 24. A flange 28 extends radially outwardly from the open exterior end 22. A pair of apertures 30 are formed through a central axial extent of the side wall at diametrically opposed locations. The flange includes exteriorly facing marking notches 32 formed on its exterior surface in circumferential alignment with the apertures 30.

The second major component of the assembly is the support 14. The support 14 is positionable within the opening 36 of the housing 12. The support has an interior extent 38 in a cylindrical configuration. The support 14 also has a forward extent 40 with a hook 42. The hook is rotatable between a position aligned with the recesses 32 when locked but is rotatable out of alignment with the recesses for axial movement of the hook and support.

A cylindrical extent of the support 14 is formed with a pair of recesses 46. Each of the recesses has a rearward portion inwardly thereof and a forward portion outwardly thereof. The forward portion of the recess is formed as a ramp 48. The rearward portion of each recess is formed as a radial ledge 50.

Next provided in the assembly 10 are a pair of leaf springs 16. Each leaf spring has a forward end 54 secured by a pin 56 to the exterior surface of the housing axially aligned on opposite sides of the housing. Each leaf spring also has a rearward end 58 movable radially with respect to its associated aperture. Each leaf spring also has a central extent 60. The central extent extends into the housing and into the recess of the support.

The central portion 60 of each spring 16 is configured with a radial extent 62 extending transverse to the longitudinal axis of the housing and the support. Each leaf spring also has a forward extent 64 formed at an angle generally parallel with that of the ramp 48. The housing 12 with its apertures 30 and springs 16 are sized and positioned with respect to the support 14 and its recesses 46 to effect a locking relationship therebetween. When the support 14, however, is depressed the support 14 may move radially outwardly by the force of the ramp 48 of the support 14 against the forward extent 64 of the spring 16 to effect disengagement therebetween. Thereafter, rotation of the support will allow the support to move the hook exteriorly of the housing 12 into an operative position.

The last major component of the assembly is the coil spring 18. The coil spring is centrally located between the end cap 26 and the rearward surface 68 of the support 14. It is preferably located within a recess 70 in such rearward surfaces 68 to insure its central positioning. The spring functions to urge the support 14 outwardly to the exposed operative orientation. When, however, the leaf springs 16 are located within the recesses 46 of the support, the abutting relationship between the flat surface 62 of the leaf spring and the flat surface 50 of the insert preclude movement of the support to the exposed orientation.

Figure 5:
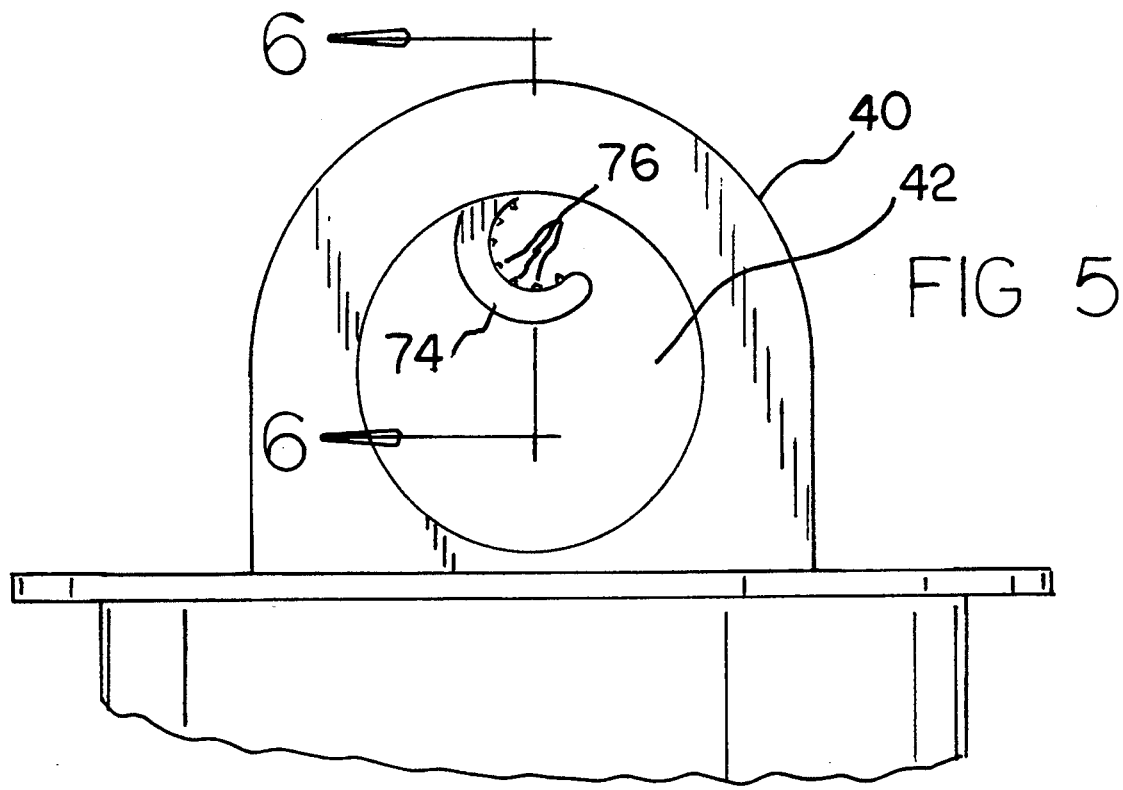
FIG. 5 is a plan view of the upper extent of the device similar to the prior Figures but illustrating an alternate embodiment thereof.
Figure 6:
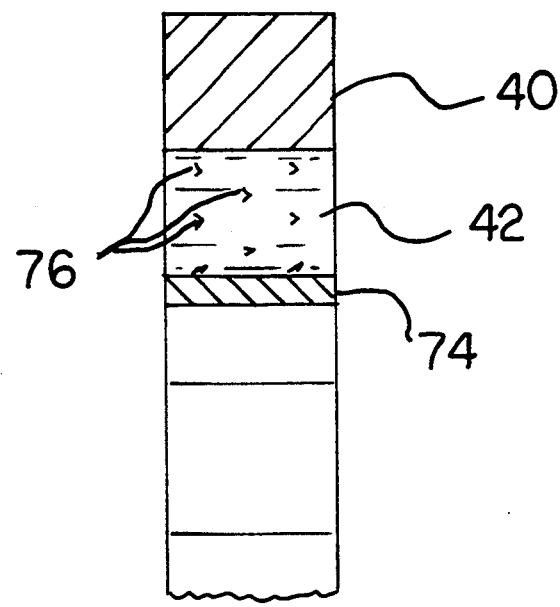
FIG. 6 is a cross-sectional view taken along line 6—6 of FIG. 5.

In the alternate embodiment of the invention as illustrated in FIGS. 5 and 6, the hook 40 is formed with a circular loop 42 as in the prior embodiment. The circular loop, however, further includes an arcuate extent 74 within the circular loop 42. The arcuate extent functions as a rope gripper. The rope gripper is provided with barbs 76 on its interior surface to further facilitate the gripping of ropes in contact therewith.

Figure 7:
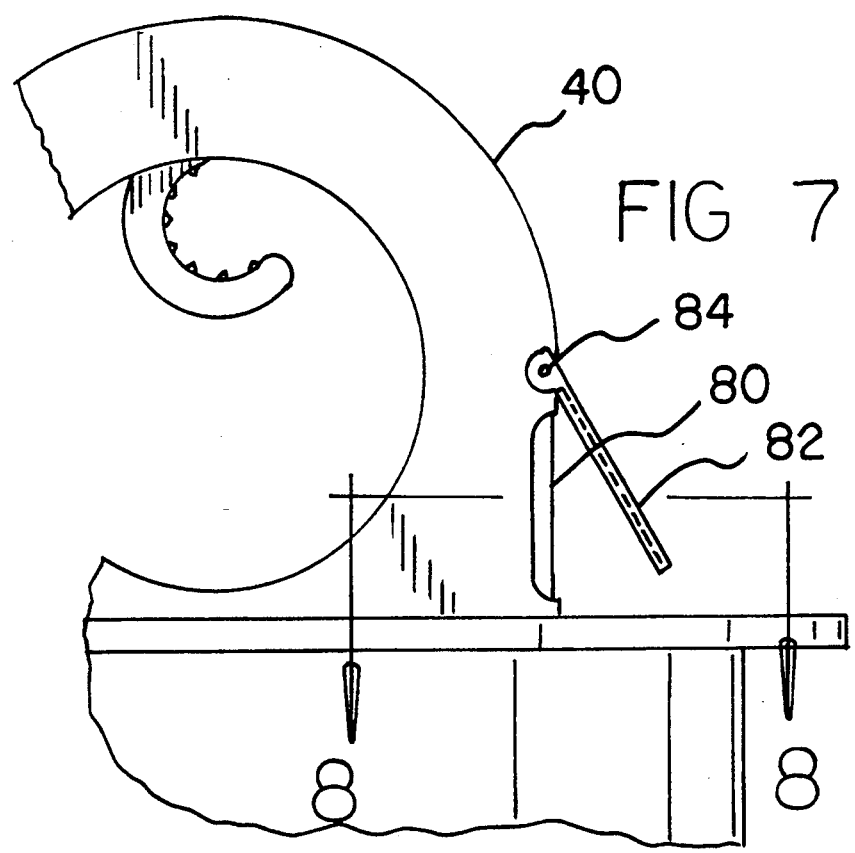
FIG. 7 is a partial elevational view similar to that of FIG. 5 but illustrating another alternate embodiment of the invention.
Figure 8:
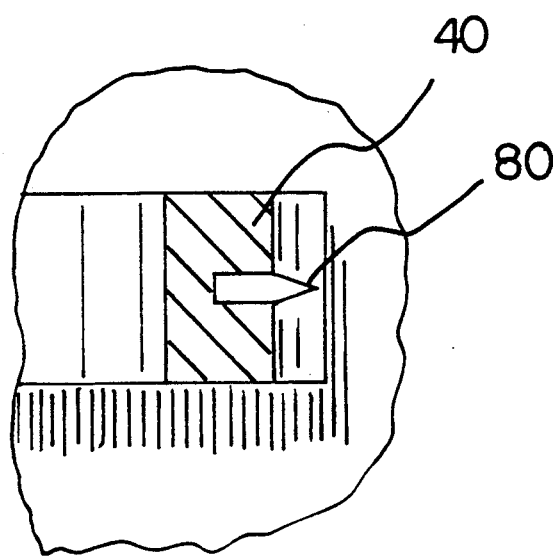
FIG. 8 is a cross-sectional view taken along line 8—8 of FIG. 7.

The final embodiment of the invention is shown in FIG. 7. In such final embodiment, the hook 40 is configured as in the embodiment of FIGS. 5 and 6. The hook, however, is formed with a cutting blade 80. The blade is located along one lower edge of the hook. A clip 82 is positioned thereover and is pivotable about a pin 84 so as to rotate between a closed inoperative orientation with the clip over the blade. The clip may be moved to the position shown in FIG. 7 to expose the blade for cutting purposes.

The present invention provides a method of securing a tonneau cover for a truck that allows quick and easy locking and unlocking of the device. Typical tonneau covers are secured by means of a series of bolts and butterfly nuts. While this method is satisfactory for items not requiring frequent access to the cargo of the truck, it is too time-consuming otherwise. On the other hand, the present invention affords easy access to cargo, saving the user much time and sparing considerable frustration.

The key to the present invention is its straightforward "push-button" design. The user simply pushes the hook hole button down into its housing to lock it. When pushed down, it automatically locks by means of two latches, one on each side. Push again to unlock and move the button into an "up" position. A spring in the bottom of the housing causes the button to pop up.

The present invention should appeal to anyone who owns a tonneau cover and is tired of how tedious it is to operate the nut and bolt locks on it. It is difficult to imagine people preferring some other type of tonneau cover locking device once they learn of the advantages of this one.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An improved hook assembly reciprocable between a recessed inoperative position and an exposed operative position comprising, in combination:

a housing formed with a cylindrical side wall having an open exterior end and in interior end with a circular end cap enclosing the side wall at the interior end to define a cylindrical opening therebetween, a flange extending radially outwardly from the open exterior end, a pair of apertures formed through a central axial extent of the side wall at diametrically opposed locations and exteriorly facing marking notches formed on the exterior surface of the flange in circumferential alignment with the apertures;

a support positionable within the opening of the housing, the support having an interior extent in a cylindrical configuration and a forward extent with a hook, the cylindrical extent including a pair of recesses at an intermediate axial extent defining a rearward portion inwardly thereof and a forward portion outwardly thereof, each recess having an angled forward ramp and a rearward radial edge;

a pair of leaf springs each having a forward end, a rearward end and a central portion therebetween, the forward end being secured to the exterior surface of the housing axially aligned on opposite sides of the housing, the rearward end being movable radially with respect to its associated aperture, the central portion having a forward extent and a rearward extent and extending into the housing, the central portion of each spring being configured with the rearward extent extending axially transverse to the longitudinal axis of the housing and support, the forward extent of each central portion being formed at an angle generally parallel with the ramp, the housing with its apertures and springs being sized and positioned with respect to the support and its recesses whereby when the hook is in the forward operative position the central portions of the springs are located within the recesses to effect a locking relationship therebetween but when the support is depressed the support will move radially outwardly by the force of the ramp of the support against the forward extent of the spring to effect a disengagement therebetween whereupon rotation of the support will allow the support to move the hook to the operative position;

a coil spring located between the end cap and the rearward surface of the support urging the support to the exposed operative orientation;

the hook being formed as a circular loop and further including an arcuate extent within the circular loop for functioning as a rope gripper with barbs on the interior surface of the arcuate extent; and further including a cutting blade formed on an exterior portion of the loop with a clip pivotally mounted with respect thereto for shielding the blade for safety purposes.

2. A hook reciprocable between a recessed inoperative position and an exposed operative position comprising:

a housing formed with a cylindrical side wall having an open exterior end and an interior end with a circular end cap enclosing the side wall at the interior end to define a cylindrical opening therebetween, a flange extending radially outwardly from the open exterior end, a pair of apertures formed through a central axial extent of the side wall at diametrically opposed locations and exteriorly facing marking notches formed on the exterior surface of the flange in circumferential alignment with the apertures;

a support positionable within the opening of the housing, the support having an interior extent in a cylindrical configuration and a forward extent with a hook, the cylindrical extent including a pair of recesses at an intermediate axial extent defining a rearward portion inwardly thereof and a forward portion outwardly thereof, each recess having an angled forward ramp and a rearward radial edge;

a pair of leaf springs each having a forward end, a rearward end and a central portion therebetween, the forward end being secured to the exterior surface of the housing axially aligned on opposite sides of the housing, the rearward end movable radially with respect to its associated aperture, the central portion having a forward extent and a rearward extent and extending into the housing, the central portion of each spring being configured with the rearward extent extending axially transverse to the longitudinal axis of the housing and support, the forward extent of each central portion being formed at an angle generally parallel with the ramp; and a coil spring located between the forward surface of the end cap and the rearward surface of the housing urging the housing to the deployed orientation.

3. The assembly as set forth in claim 2 wherein the hook is formed as a circular loop and further including an arcuate extent within the circular loop for functioning as a rope gripper with barbs on the interior surface of the arcuate extent.

4. The assembly as set forth in claim 3 and further including:

a cutting blade formed on an exterior portion of the loop with a clip pivotally mounted with respect thereto for shielding the blade for safety purposes.

* * * * *